April 26, 1927.
S. KERSTEN
1,626,343
MIXING VALVE SUPPORT FOR LAUNDRY TRAYS
Filed July 18, 1924
2 Sheets-Sheet 1
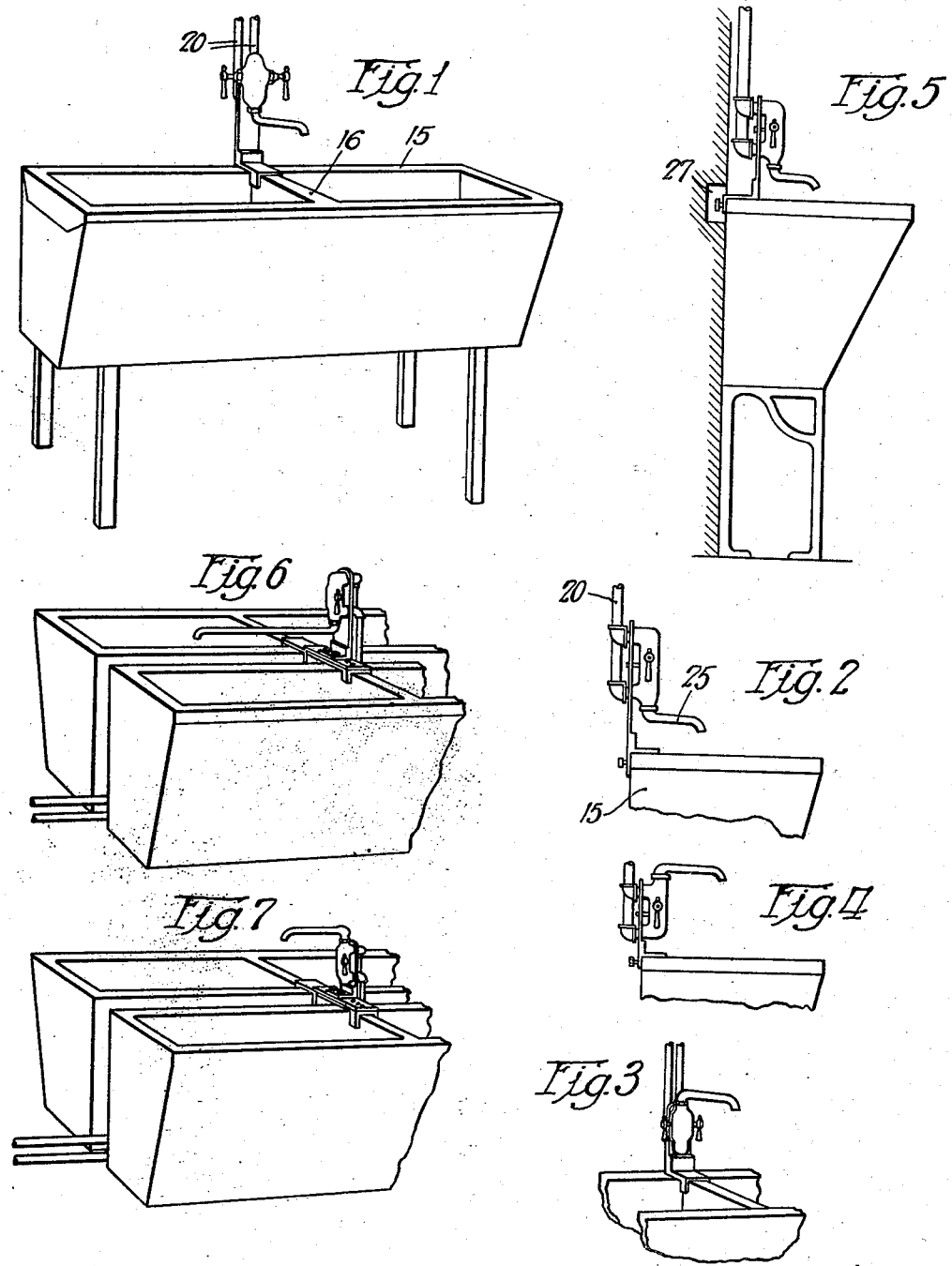
Inventor
Samuel Kersten
George E. Mueller Atty.

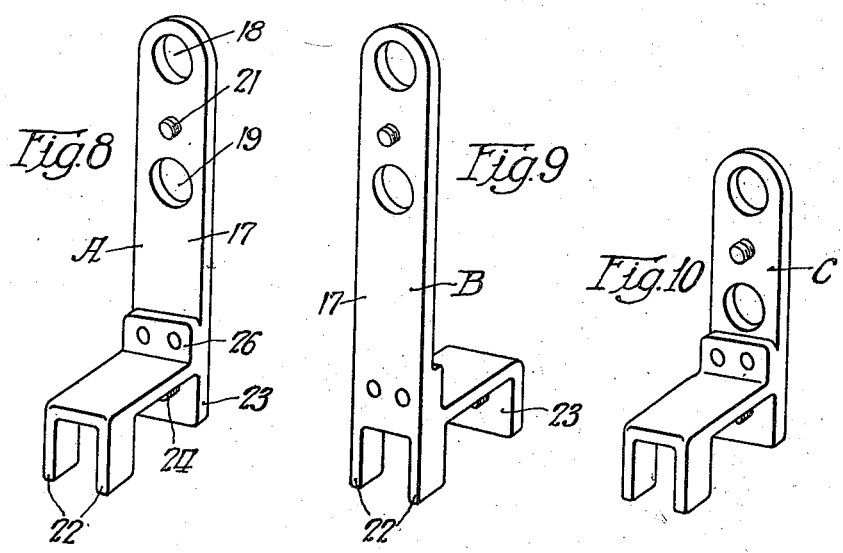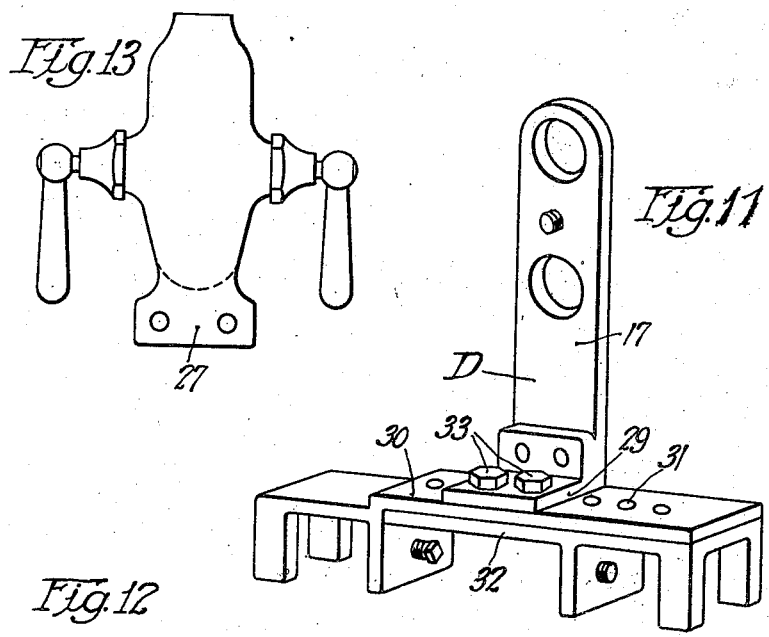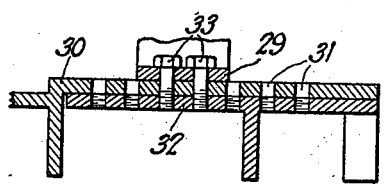

Patented Apr. 26, 1927.

1,626,343

UNITED STATES PATENT OFFICE.

SAMUEL KERSTEN, OF CHICAGO, ILLINOIS.

MIXING-VALVE SUPPORT FOR LAUNDRY TRAYS.

Application filed July 18, 1924. Serial No. 726,881.

My invention relates to mixing valve supports for laundry trays, being directed more particularly to the provision of an arrangement whereby a hot and cold water mixing valve may be supported by attachment to the laundry tray and whereby the valve is supported above the tray so that by the provision of a swinging spout it may be used to feed a number of compartments of the tray.

One of the features of my invention is the provision of an arrangement whereby the mixing valve is supported above the tray so that a single swinging spout may be rotated to feed any one of four partitions.

Another feature of my invention is that by my improved support the mixing valve may be hung above the tray in such a way that the supply pipes may be led from above and the tray set flush against the wall, thereby eliminating the usual open space between the tray and the wall, which ordinarily acts as a dust catcher.

Another feature of my invention is that it may be attached so as to suspend a single mixing valve above two double trays set back to back, but adjusted and clamped to hold the trays rigidly separated sufficiently to permit the waste vent and water supply piping to come up from the floor between the tubs.

A feature of my invention is that installations may be readily made in a simplified manner, eliminating a great deal of labor and equipment as ordinarily employed where the hot and cold water faucets are run through the rear wall of each compartment, this saving being of vital importance in view of the high cost of labor and material.

There are various other features of my invention, but these will be more particularly pointed out in the ensuing part of the specification and the appended claims.

For a better understanding of my invention, reference is to be had to the accompanying drawings, in which—

Fig. 1 is a perspective view showing one form of my improved hanger applied to a two-compartment laundry tray;

Fig. 2 is an end view of Fig. 1;

Fig. 3 is a perspective view showing only part of the tub, but with the faucet inverted and the swinging spout overhanging the tub;

Fig. 4 is a side or end view of Fig. 3;

Fig. 5 is an end view of a tray similar to Fig. 1, except that the hanger is reversed to that of Fig. 1, permitting moving the tub back against the wall;

Fig. 6 shows the installation of a mixing valve above two two-compartment trays set back to back, permitting feeding any one of the four trays;

Fig. 7 is a view similar to Fig. 6, except that the valve is reversed with the swinging spout overhead;

Fig. 8 shows one form of bracket and is of the type illustrated in Figs. 1 and 2;

Fig. 9 shows a reversed type of bracket, that is as illustrated in Fig. 5;

Fig. 10 illustrates a shortened bracket for use with the inverted mixing valve, as in Fig. 4;

Fig. 11 shows a support of the type illustrated in Fig. 6;

Fig. 12 is a vertical longitudinal sectional view through the center of the foot of Fig. 11; and Fig. 13 is a modified form of mixing valve adapted to be attached by a lug directly to the support.

My invention is particularly useful in combination with the type of hot and cold water mixing valve shown in my Patent Number 1,462,413, dated July 17, 1923, which is of the type illustrated in Figs. 1 to 7 and similar to that shown in Fig. 13 except in the latter figure a lug is shown extending from the bottom of the valve body for attaching it to the support.

Referring now more in detail to the arrangement of Figs. 1 and 2, which include the hanger of Fig. 8, I show a two-compartment laundry tray having a rear wall 15 and center partition 16. The hanger comprises a vertical standard 17 having openings 18—19 therethrough, preferably arranged to receive the supply necks of the valve, which in the type herein illustrated are in vertical alignment. Thus the supply pipes as 20 are secured to the supply necks, and in order to rigidly hold the valve on the bracket a set screw as 21 is threaded through the standard so as to abut the valve body and force the shoulders of the supply pipe connections against the standard to hold the parts in rigid engagement. Now in order to attach the hanger to the tray, I provide a foot or base member adapted to engage the tray walls where the central and rear partitions meet, as indicated in Fig. 1.

To this end one portion of the base comprises a downwardly extending bifurcated end 22, adapted to embrace the center partition 16 while the rear extension 23 is adapted to pass down behind the rear wall and clamp the foot to the tray by means of the set screw 24. Thus in the hanger A of Fig. 8 the valve is supported above the tray and by use of a swinging spout 25, either of the compartments of the tray may be supplied with water. Thus with the use of the mixing nozzle, either hot or cold water may be supplied or the two mixed, as desired.

The hanger A is also provided with an enlarged or lug portion 26 so that the portion of the standard above this lug may be readily sawed off by the installer and a valve of the type shown in Fig. 13 directly attached to the lug 26 by means of the lug extension 27 of the valve.

Thus the arrangement of Figs. 1 and 2 may be used where the laundry trays are not to be set directly against the wall or partition, and in which the supply pipes 20 may come down from above as illustrated in Figs. 1 and 2, or may come up from below between the tray and the wall.

In Fig. 9 I show a hanger B similar to A except that the bifurcated end 22 is beneath the standard portion 17 and the clamping end 23 offset. This permits installation as in Fig. 5, with the laundry tray erected flush with the wall or partition. The installer simply cutting out a part of the wall as at 27 to permit the insertion of the clamping screw and small bracket portion. This permits bringing the supply pipes down from above.

In the arrangements of Figs. 1 and 2 it will be noted the swinging spout is beneath the faucet.

In Figs. 3 and 4 I show the installation with the swinging spout overhead, that is the mixing valve reversed. In such case a shorter bracket as C of Fig. 10 may be used, which bracket may be constructed with its base either as in Figs. 8 and 10, or reversed as in Fig. 9.

In Fig. 6 I show an installation in which the mixing valve is supported so as to feed any one of the four compartments of two adjoining trays set back to back. To this end I use an adjustable bracket of the character shown in Fig. 11, which has an upright 17 similar to brackets A and B but is provided with an adjustable double claw base adapted to be attached to both tubs. This base of adjustable bracket D comprises relatively slidable portions secured beneath the angular part 29 at the base of the standard 17, the upper slidable member 30 having a series of openings 31 therethrough which register with corresponding openings in the lower sliding plate 32, each of said plates 30 and 32 carrying an attaching claw or base similar in construction to that of the hangers A, B and C already described. Thus the hanger D may be readily attached to the adjoining trays as in Figs. 6 and 7 and securely clamped to the walls and partitions thereof. The trays are set suitable distances apart as desired, and of course the parts of hanger D are correspondingly adjusted and held together by the clamping screws 33 and the parts clamped to the trays. This rigidly attaches the hanger to the trays and at the same time holds them immovable.

From the foregoing it will be seen that I have provided a construction which permits ready assembling or application of the faucet to the trays, and saves piping and labor because where ordinarily four faucets are provided in a two-compartment tray and the corresponding piping supply thereto for hot and cold water, by my arrangement a single faucet is attached outside the tray. Furthermore, the arrangement is readily applicable so as to supply four compartments of two trays from a single faucet. Also by the use of the adjustable hanger this serves as a clamping device for securing the tubs or trays, thereby dispensing with labor ordinarily required in the usual installation for clamping the tubs at extreme ends by blocks or other crude methods now in use.

Although I have illustrated my invention by particular type of mixing valve, I contemplate using it in other ways than that shown and do not desire to be limited to the exact structure shown and described, but aim to cover all that which comes within the spirit and scope of the appended claims.

What I claim as new and desire to secure by United States Letters Patent is:

1. A mixing valve support for laundry trays comprising a vertical standard having openings therein through which supply necks for the valve pass and whereby the valve is secured to the standard, a claw foot for the standard for embracing the walls of the tray, and means for clamping the foot to the tray walls.

2. A mixing valve support for laundry trays comprising a vertical standard having openings therein through which supply necks for the valve pass and whereby the valve is secured to the standard, a claw foot for the standard for embracing the walls of the tray, said foot comprising a bifurcated downward extension for passing over the separating wall of the tray and a rear extension for passing down over the rear outer wall of the tray, and means for clamping the foot to the tray walls.

3. A mixing valve support for laundry trays comprising a standard having an opening therethrough through which a supply neck for the valve passes and whereby the valve is secured to the standard, and a clamping foot extension at the base of the standard for securing the support to the walls of the tray.

4. A mixing valve support for two two-compartment laundry trays positioned back to back comprising a vertical standard for attachment to the valve, and a pair of claw foot attachments each for embracing one of the trays at the junction of the rear wall and central partition comprising a bifurcated downward extension for passing over the partition and a rear extension for passing down over the rear outer wall with means for clamping the foot to the tray walls, said claw foot attachments being adjustably secured to the standard for application to tubs of varying distances apart.

5. In combination with a mixing valve having vertically aligned inlet necks extending horizontally therefrom and an outlet, of a support therefor for laundry trays comprising a vertical standard having vertically aligned openings therethrough through which the valve necks extend and whereby the valve is supported, a foot for the standard for embracing the walls of the tray, and means for securing the foot to the walls.

In witness whereof, I hereunto subscribe my name this 14th day of June, 1924.

SAMUEL KERSTEN.